US012713087B2

(12) United States Patent
Lu et al.

(10) Patent No.: US 12,713,087 B2
(45) Date of Patent: Aug. 18, 2026

(54) WEB-BASED VIDEO EFFECT ADDITION

(71) Applicant: Microsoft Technology Licensing, LLC, Redmond, WA (US)

(72) Inventors: Bo Lu, Redmond, WA (US); Xin Pan, Redmond, WA (US); Minliang Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/687,714

(22) PCT Filed: Jul. 9, 2022

(86) PCT No.: PCT/US2022/036600
§ 371 (c)(1),
(2) Date: Feb. 28, 2024

(87) PCT Pub. No.: WO2023/033923
PCT Pub. Date: Mar. 9, 2023

(65) Prior Publication Data

US 2025/0069300 A1 Feb. 27, 2025

(30) Foreign Application Priority Data

Sep. 2, 2021 (CN) ......................... 202111027952.9

(51) Int. Cl.
*G06T 11/60* (2026.01)
*H04N 21/4728* (2011.01)

(52) U.S. Cl.
CPC ......... *G06T 11/60* (2013.01); *H04N 21/4728* (2013.01)

(58) Field of Classification Search
CPC ................ G06T 11/60; H04N 21/4223; H04N 21/44008; H04N 21/47205; H04N 21/4728; H04N 21/8153; H04N 21/41407
See application file for complete search history.

(56) References Cited

U.S. PATENT DOCUMENTS 8,935,611 B2 1/2015 Oberbrunner
2009/0009532 A1 1/2009 Hallberg
(Continued)

FOREIGN PATENT DOCUMENTS

CN 107609051 A 1/2018
CN 111565332 A 8/2020
(Continued)

OTHER PUBLICATIONS

Arsenova, Alena., "How Augmented Reality Improves Video Calls", accessed on link https://www.banuba.com/blog/augmented-reality-for-video-calls, Apr. 8, 2020, 14 pages.
(Continued)

*Primary Examiner* — Jin Cheng Wang
(74) *Attorney, Agent, or Firm* — Schwegman Lundberg & Woessner, P.A.

(57) ABSTRACT

The present disclosure provides methods and apparatuses for implementing video effect addition. At a target application, an original video frame may be obtained from a video source; the original video frame may be provided to a video effect processing application, the video effect processing application being a Web application; and a processed video frame to which a video effect is applied may be obtained from the video effect processing application. At a video effect processing application, an original video frame may be obtained from a target application; a video effect may be applied to the original video frame to obtain a processed video frame; and the processed video frame may be provided to the target application.

20 Claims, 9 Drawing Sheets

(56) References Cited

U.S. PATENT DOCUMENTS

| | | | | |
|---|---|---|---|---|
| 2012/0220372 | A1* | 8/2012 | Cheung | A63F 13/22 463/37 |
| 2017/0285922 | A1 | 10/2017 | Leblanc et al. | |
| 2019/0082239 | A1* | 3/2019 | Webster | H04N 21/2743 |
| 2021/0321157 | A1* | 10/2021 | Li | H04N 21/85 |
| 2022/0038641 | A1* | 2/2022 | Chang | G11B 27/036 |
| 2022/0156887 | A1* | 5/2022 | Lin | G06T 5/50 |
| 2022/0392026 | A1* | 12/2022 | Wang | H04N 21/2743 |
| 2023/0059097 | A1* | 2/2023 | Zhang | H04L 67/02 |
| 2023/0209148 | A1* | 6/2023 | Park | H04N 21/2743 725/114 |
| 2024/0087608 | A1* | 3/2024 | Zhou | H04N 5/262 |

FOREIGN PATENT DOCUMENTS

| | | |
|---|---|---|
| CN | 111669623 A | 9/2020 |
| CN | 112601047 A | 4/2021 |

OTHER PUBLICATIONS

Brown, Steve., "What is the Impact of Visual Content Marketing?", accessed on link https://rocketium.com/academy/impact-visual-content-marketing/, Jul. 19, 2018, 9 pages.

Clarkson, Kari., "12 Hard Stats That Proof the Power of Images", accessed on link https://www.searchenginepeople.com/blog/925-image-stats.html, May 6, 2014, 5 pages.

Harris, Eisenberg., "Humans Process Visual Data Better", Thermopylae website. Published Sep. 15, 2014, accessed on https://www.t-sciences.com/news/humans-process-visual-data-better.

International Search Report and Written Opinion received for PCT Application No. PCT/US22/036600, Oct. 5, 2022, 9 pages.

Lefkowitz Melanie., "Appearance, social norms keep students off Zoom cameras", accessed on link https://www.sciencedaily.com/releases/2021/01/210119194320.htm, Jan. 19, 2021, 9 pages.

Leskin, Paige., "There's a filter on Zoom you can use to look better on video calls while working from home. Here's how to turn on the setting", accessed on link https://www.businessinsider.com/zoom-video-conferencing-filter-touch-up-work-from-home-coronavirus-2020-3?IR=T, Mar. 20, 2020, 11 pages.

Medina, John., "Brain Rule Rundown", accessed on link https://brainrules.net/vision/, retrieved on Jul. 8, 2024, 2 pages.

Payne, Lisa., "Beauty Filters Upgrade Video-Conference Calls", May 14, 2020, accessed on https://www.stylus.com/beauty-filters-upgrade-videoconference-calls.

Smith, Lilly., "From soft lighting to the Golden Gate Bridge: Your complete guide to videoconference filters", accessed on link https://www.fastcompany.com/90479757/from-soft-lighting-to-the-golden-gate-bridge-your-complete-guide-to-video-conference-filters, Mar. 20, 2020, 19 pages.

Terrace, rt I., "JavaScript in JavaScript (js.js): Sandboxing third-party script", In Proceedings of 3rd USENIX Conference on Web Application Development, Jun. 13, 2012, 6 pages.

Tumasyk, Ihar., "Creating an Android Face Filter App Using Banuba Face AR SDK", accessed on link https://www.infoq.com/articles/android-face-filter-banuba-sdk/, Feb. 17, 2021, 19 pages.

Willings, Adeian., "How to turn yourself into a potato or a cat (and other things) for Zoom meetings, Teams calls and more", accessed on link https://web.archive.org/web/20210217123327/https:/www.pocket-lint.com/apps/ news/151723-how-to-turn-yourself-into-a-potato-and-other-filters-for-zoom-meetings-and-team-calls, Feb. 17, 2021, 27 apges.

First Office Action Received for Chinese Application No. 202111027952.9, mailed on Jan. 19, 2026, 16 Pages (English Translation Provided).

Notice of Grant received for Chinese Application No. 202111027952.9, mailed on Jun. 15, 2026, 9 pages (English Translation Provided).

* cited by examiner

WEB-BASED VIDEO EFFECT ADDITION

CLAIM OF PRIORITY

This application is a U.S. National Stage Filing under 35 U.S.C. 371 of International Patent Application Serial No. PCT/US2022/036600, filed Jul. 9, 2022, and published as WO 2023/033923 A1 on Mar. 9, 2023, which claims the benefit of priority to Chinese Patent Application No. 202111027952.9, filed Sep. 2, 2021, which applications and publication are incorporated herein by reference in their entirety.

BACKGROUND

In video-related scenarios, there exists a need of video effect addition. A user may desire to be able to apply a video effect to a video while using a video-related application. Herein, a video-related application may refer to various applications involving operations, e.g., capturing, transferring, presenting, etc., to videos, e.g., an online meeting application, a video streaming service application, etc. Furthermore, applying a video effect to a video may broadly refer to editing or changing pixels in a video frame, e.g., performing operations, such as deleting, replacing, adding, modifying, etc., to pixels. Taking an online meeting application as an example, a meeting participant may desire to apply a video effect, e.g., to apply a filter, to an original video image of the meeting participant captured by a camera, so as to change the original video image as having a desired video effect.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for implementing video effect addition. In some embodiments, at a target application, an original video frame may be obtained from a video source; the original video frame may be provided to a video effect processing application, the video effect processing application being a Web application; and a processed video frame to which a video effect is applied may be obtained from the video effect processing application. In some embodiments, at a video effect processing application, an original video frame may be obtained from a target application; a video effect may be applied to the original video frame to obtain a processed video frame; and the processed video frame may be provided to the target application.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

Figure 1:
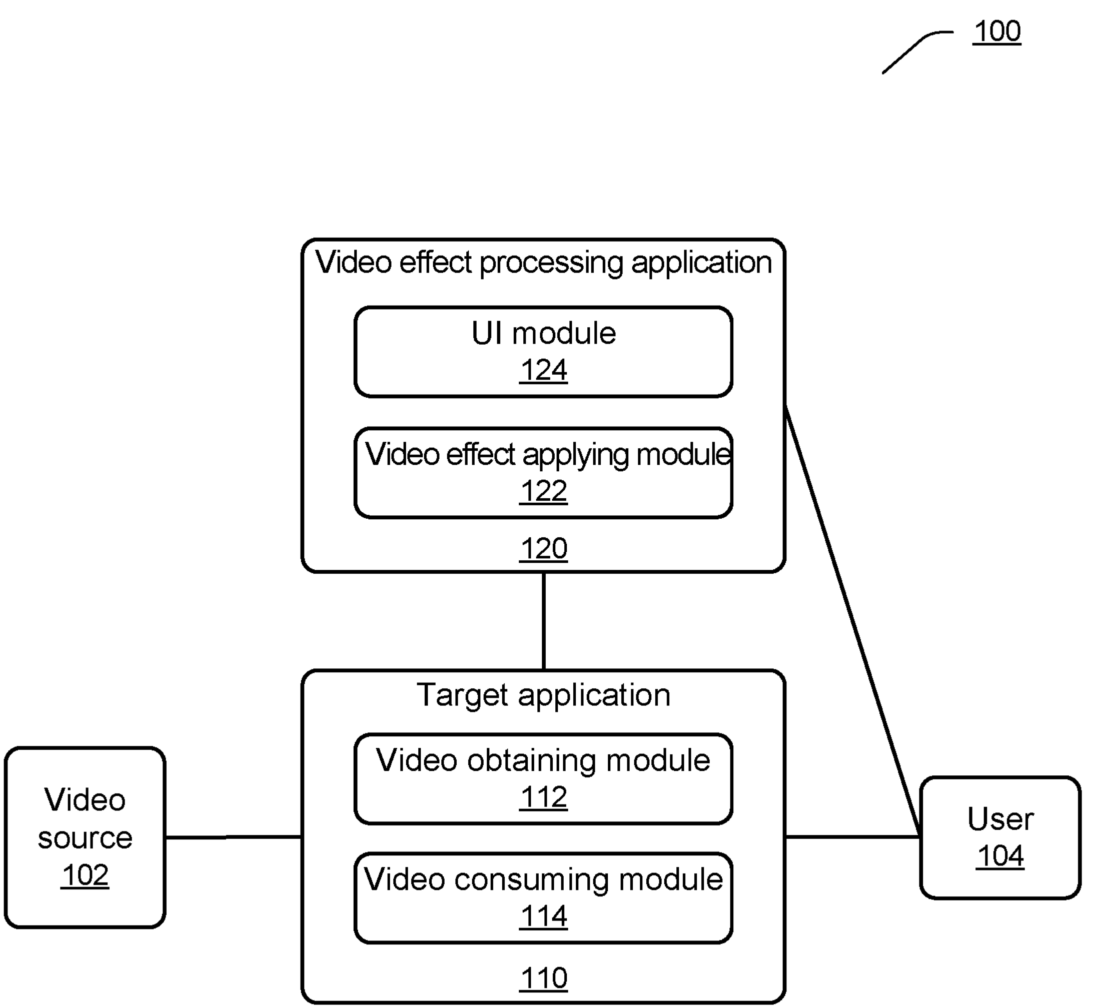
FIG. 1 illustrates an exemplary architecture for implementing video effect addition according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Since video effects are performance sensitive, traditional video effects are usually implemented as binary codes compiled from programming languages such as C/C++. These binary codes corresponding to video effects will form a separate binary code library. If it is desired to provide a video effect addition function in a video-related application, it is needed to download and install the binary code library, which is for applying video effects, in advance. The binary code library is embedded into the video-related application and serves as underlying codes of the video-related application for providing the video effect addition function. When applying a video effect to a video, a binary code corresponding to the video effect needs to be run in the local machine. Both installation and running of binary codes will require great efforts to avoid security risk issues. Moreover, the processes of distributing and upgrading the binary code library are complicated, and for the purpose of providing a video effect addition function, developers of a video-related application need to make great efforts to develop various application features, so as to perform processings such as downloading, revising, updating, running, etc. to the binary code library which is for applying video effects.

Embodiments of the present disclosure propose Web-based video effect addition, e.g., a Web-based video effect processing application may be used for assisting a target application in implementing video effect addition. The target application may broadly refer to various video-related applications that require video effect addition, e.g., an online meeting application, a video streaming service application, a video editing application, etc. The target application may be a Web application, a desktop application, etc. The video effect processing application may apply a video effect to a video frame by using a video effect library and a video effect algorithm prepared in advance. The video effect processing application may be a Web application, and may be a normal Web page running in a Web content container. For example, the video effect processing application may be a Web page which is implemented with HTML, Cascading Style Sheets (CSS), Javascript, etc. Thereby, the video effect processing application may be loaded at any time without installation. The Web content container may refer to various Web-based containers used for loading or running applications, e.g., iframe (inline frame), Webview (Web page view), etc., wherein the iframe is an HTML carrier of a Web page and is used for loading a Web page in a Web page or browser environment, and the Webview is a native carrier of a Web page and is used for loading a Web page in a native environment. When it is needed to apply a video effect to a video frame, the video effect processing application may be loaded in the target application through the Web content container, so that the video effect processing application may apply the video effect to the video frame provided by the target application and return to the target application a processed video frame to which the video effect is applied. Therefore, the target application may also be regarded as a host application of the video effect processing application. Different from the existing video-related applications that include the binary code library as a part of themself to implement a video effect addition function, the Web-based video effect processing application according to the embodiments of the present disclosure may be a third-party application, which may be loaded by the target application at any time without installation. Therefore, the target application may conveniently access various video effect processing applications developed by different third parties, so as to obtain enhanced extensibility of video effect addition and provide users with more diverse video effects. Moreover, since there is no need to install and run binary codes corresponding to video effects in the local machine, the embodiments of the present disclosure may effectively avoid security risk issues. Moreover, video effect addition processings by the Web-based video effect processing application may be managed and performed in, e.g., a browser, and the browser has its own security mechanism to prevent a running script from maliciously accessing the local system and resources, and thus the embodiments of the present disclosure may further effectively avoid security risk issues.

With the development of Web technologies such as WebAssembly, WebGL, WebGPU, etc., video effects running in a browser may be efficiently implemented. Accordingly, the development, deployment and upgrade of a Web page-based video effect processing application will become easier. Furthermore, since various Web technologies are currently widely used, this will encourage more third parties to develop more video effects that may be used by the target application.

In the case that the target application is a desktop application, an original video frame and a processed video frame may be efficiently communicated between the target application and the video effect processing application through a shared memory. Synchronous assess to the shared memory from the target application and the video effect processing application may be implemented through inter-process communication. Moreover, a customized application programming interface (API) may be set at least for the video effect processing application for accessing the shared memory. Through using the shared memory, the embodiments of the present disclosure may implement better video frame transferring performance, thereby effectively improving execution efficiency of video effect addition.

In the case that the target application is a desktop application, the video effect processing application may run in a sandbox environment, e.g., in a sandboxed Web content container, so that security risk issues may be further effectively avoided.

In the case that the target application is a Web application, an original video frame and a processed video frame may be efficiently communicated between the target application and the video effect processing application in an approach of transferrable ArrayBuffer.

The embodiments of the present disclosure may easily implement video effect addition at any target application that requires video effects, may obtain enhanced extensibility of video effect addition, may effectively avoid security risk issues, may achieve higher execution efficiency of video effect addition, etc.

Herein, a video frame may be understood as a constituent unit of a video, i.e., a video may include a plurality of video frames, so that video effect addition with respect to a video may be implemented through applying a video effect to each video frame in the video. Although multiple parts of the present disclosure only describes applying a video effect to a video frame, it should be understood that a video effect may be applied to each video frame in a video in a similar approach, thereby achieving video effect addition with respect to the entire video. Thus, the processing to a video frame is also equivalent to the processing to a video, and accordingly, the term "video frame" and the term "video" may be used interchangeably in multiple parts of the present disclosure. Moreover, herein, the term "application" may broadly refer to application program, application software, widget, program codes, etc.

FIG. 1 illustrates an exemplary architecture 100 for implementing video effect addition according to an embodiment.

In the architecture 100, a target application 110 may be various video-related applications that require video effect addition. A video effect processing application 120 is a Web application that may be loaded by the target application 110 for applying a video effect to a video frame.

The target application 110 may obtain original video frames from a video source 102. The video source 102 may refer to various sources capable of providing video frames. For example, the video source 102 may be a camera, and accordingly, the target application 110 may obtain a video shot by the camera as the original video frames. For example, the video source 102 may be a video file stored locally or on the network, and accordingly, the target application 110 may obtain video content in the video file as the original video frames. For example, the video source 102 may be a video stream received during the running of the target application 110, and accordingly, the target application 110 may take video frames in the video stream as the original video frames. It should be understood that although the video source 102 is shown in FIG. 1 as being separate from the target application 110, the video source 102 may also be included in the target application 110. Moreover, herein, an original video frame refers to a video frame obtained by the target application 110 from the video source 102, and the original video frame may be a video frame that has not been edited yet or a video frame that has been edited.

The target application 110 may include a video obtaining module 112, a video consuming module 114, etc. The video obtaining module 112 may be used for obtaining video frames required by the target application 110. In an aspect, the video obtaining module 112 may obtain an original video frame from the video source 102 and communicate the original video frame to the video effect processing application 120. In another aspect, the video obtaining module 112 may obtain, from the video effect processing application 120, a processed video frame to which a video effect is applied.

The video consuming module 114 may use or process a processed video frame obtained by the video obtaining module 112, in different approaches under different scenarios. For example, in the case that the target application 110 needs to send the processed video frame through the network, the video consuming module 114 may perform processing such as encoding, uploading, etc. to the processed video frame. For example, in the case that the target application 110 needs to present the processed video frame to a user, the video consuming module 114 may present the processed video frame through a user interface (UI). For example, in the case that the target application 110 needs to store the processed video frame, the video consuming module 114 may store the processed video frame into a predetermined location. For example, in the case that the target application 110 needs to further edit the processed video frame, the video consuming module 114 may perform various editing operations to the processed video frame. For example, in the case that the target application 110 needs to provide the processed video frame to other video processing applications, the video consuming module 114 may send the processed video frame to other video processing applications. It should be understood that the embodiments of the present disclosure are not limited by how the video consuming module 114 specifically uses or processes the processed video frame.

Although not shown, the target application 110 may also include any other functional modules. For example, the target application 110 may include a UI module through which a user 104 may interact with the target application 110 in various approaches.

The video effect processing application 120 may include a video effect applying module 122, a UI module 124, etc. The video effect applying module 122 may apply a video effect to an original video frame through various video effect applying techniques. In an implementation, the video effect applying module 122 may apply a video effect to an original video frame by using a video effect library and a video effect algorithm that are prepared in advance. The video effect library includes a number of video effect materials that can be applied to a video frame. The video effect algorithm may be executed to determine a specific approach in which a video effect is applied to a video frame. The developer of the video effect processing application 120 may prepare the video effect library and the video effect algorithm in advance in any approaches. The embodiments of the present disclosure are not limited to any specific techniques adopted by the video effect processing application 120 for applying a video effect to a video frame. Moreover, the present disclosure is not limited to any specific forms of video effect, but may cover video effects obtained by editing or changing pixels in a video frame in any approaches.

The UI module 124 may be used for implementing various approaches of interaction between the user 104 and the video effect processing application 120. For example, the user 104 may input, through the UI module 124, an indication about a video effect, which may indicate how the user 104 desires to apply the video effect by the video effect applying module 122.

Although not shown, the video effect processing application 120 may also include any other functional modules.

Further exemplary illustration of the architecture 100 is given by taking an online meeting scenario as an example. The target application 110 may be an online meeting application, the user 104 may be a meeting participant, and the video source 102 may be a camera in a terminal device of the user 104. It is assumed that the meeting participant is participating in a meeting and has turned on the camera. The online meeting application may obtain a video image of the meeting participant captured by the camera, and may display the video image of the meeting participant in a meeting interface. If the meeting participant requests the online meeting application to apply a video effect, e.g., apply a filter, to his/her own video image, the online meeting application may load the video effect processing application 120. The video effect processing application 120 may receive the meeting participant's indication about a specific video effect, e.g., an indication about a specific filter, through the user interface, and may apply the corresponding video effect to the video image of the meeting participant. Then, the online meeting application will display, in the meeting interface, the video image of the meeting participant to which the video effect is applied. It should be understood that the above online meeting scenario is only an exemplary implementation scenario of the architecture 100, and the architecture 100 may also be implemented for any other scenarios involving video effect addition, e.g., a video streaming service scenario, a video editing scenario, etc. In the video streaming service scenario, the target application 110 may be a video streaming service application, which implements video effect addition to a video frame in a video stream by loading the video effect processing application 120. In the video editing scenario, the target application 110 may be a video editing application, which implements video effect addition to an input video frame by loading the video effect processing application 120.

Figure 2:
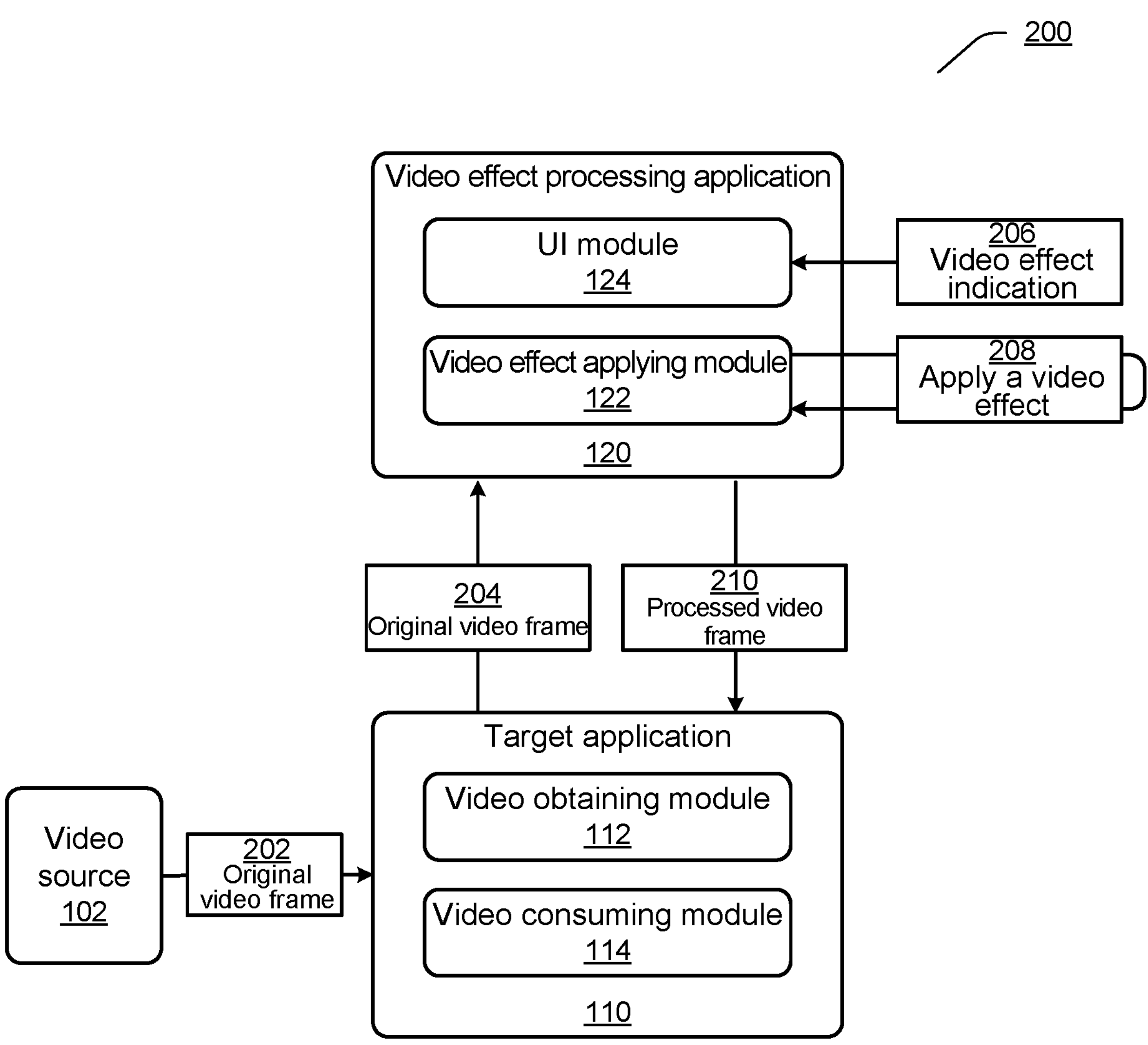
FIG. 2 illustrates an exemplary process for implementing video effect addition according to an embodiment.

FIG. 2 illustrates an exemplary process 200 for implementing video effect addition according to an embodiment. The process 200 is an exemplary process for implementing video effect addition proposed based on the architecture 100 in FIG. 1.

At 202, the target application 110 may obtain an original video frame from the video source 102. At 204, the original video frame may be communicated from the target application 110 to the video effect processing application 120. For example, the target application 110 may provide the original video frame to the video effect processing application 120, and the video effect processing application 120 may obtain the original video frame from the target application 110.

Optionally, at 206, the video effect processing application 120 may receive an indication about a video effect through a user interface. For example, the UI module 124 may receive an indication about the video effect from a user. The user may indicate which video effect is desired to apply to the original video frame by inputting the indication about the video effect. In other implementations, the receiving of the indication about the video effect at 206 may also be omitted, thus, the video effect processing application 120 may determine which video effect will be applied to the original video frame based on any predetermined rules.

At 208, the video effect processing application 120 may apply the video effect to the original video frame to obtain a processed video frame. For example, the video effect applying module 122 may apply the video effect to the original video frame through various video effect applying techniques. If the indication about the video effect is received at 206, the video effect applying module 122 may apply the video effect specified by the indication to the original video frame based at least on the indication.

At 210, the processed video frame to which the video effect is applied may be communicated from the video effect processing application 120 to the target application 110. For example, the video effect processing application 120 may provide the processed video frame to which the video effect is applied to the target application 110, and the target application 110 may obtain the processed video frame to which the video effect is applied from the video effect processing application 120. It should be understood that FIG. 2 only shows an exemplary overall process 200 for video effect addition, and when the target application 110 is implemented in different approaches, the specific process of video effect addition may further include more details. Further explanation will be given later in connection with FIG. 3 to FIG. 5.

Figure 3:
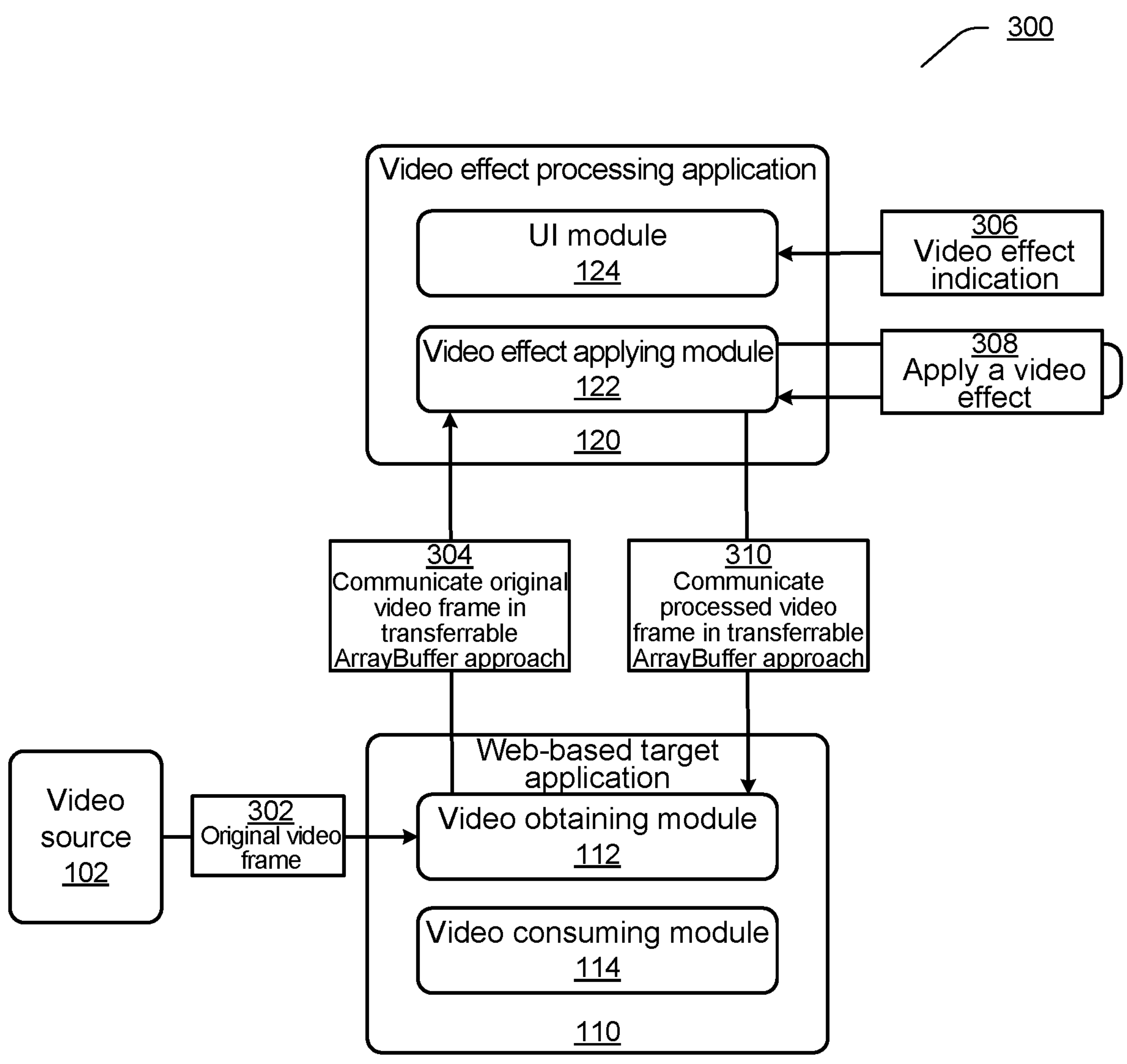
FIG. 3 illustrates an exemplary process for implementing video effect addition in the case that the target application is a Web application according to an embodiment.

FIG. 3 illustrates an exemplary process 300 for implementing video effect addition in the case that the target application is a Web application according to an embodiment.

In FIG. 3, the Web-based target application 110 indicates that the target application is a Web application. Thus, the target application 110 may be, e.g., a Web page running in a browser. The Web page corresponding to the target application 110 may also be referred to as a main Web page. In this case, the video effect processing application 120 may be an embedded Web page running in the main Web page of the target application 110. In an implementation, a Web content container in which the video effect processing application 120 runs may be, e.g., an iframe. By using the iframe, the video effect processing application 120 may be loaded in the target application 110, e.g., loading the embedded Web page of the video effect processing application 120 in the main Web page of the target application 110.

According to the embodiment of the present disclosure, the video effect processing application 120 may be loaded and run in the target application 110 through defining a URL associated with the video effect processing application 120 in the iframe.

In an implementation, a URL corresponding to the video effect processing application 120 may be defined in the iframe. Through accessing this URL, various UI data required by the UI module 124 of the video effect processing application 120 may be downloaded from a server of the video effect processing application 120, so as to implement UI display of the video effect processing application 120 at the local machine.

In an implementation, a respective URL for each video effect may be defined in the iframe. Through accessing this URL, data related to this video effect used by the video effect applying module 122 may be downloaded from the server of the video effect processing application 120 to the local machine and run at the local machine. The video effect-related data may include a video effect algorithm, video effect materials, and any other related contents corresponding to the video effect. Thus, the video effect processing application 120 may utilize the downloaded video effect-related data to locally apply the video effect to a video frame. It should be understood that video effect-related data corresponding to a video effect may be buffered locally and directly used for applying the video effect to multiple video frames, without the need of repeatedly downloading the video effect-related data for each video frame, unless the video effect-related data is updated at the server. Thereby, execution efficiency may be effectively improved. Moreover, each time the video effect needs to be applied to a new video frame, e.g., a video effect algorithm in the video effect-related data may be loaded into the process for execution, so as to apply the video effect to the new video frame. The video effect algorithm may be implemented by using e.g., Javascript, etc., and thus may be run in a Web page and managed by, e.g., a browser.

In an implementation, a URL corresponding to the video effect processing application 120 may be defined in the iframe. Through accessing this URL, various UI data required by the UI module 124 and multiple video effect-related data respectively corresponding to multiple video effects used by the video effect applying module 122 may be downloaded from the server of the video effect processing application 120, so as to implement UI display of the video effect processing application 120 at the local machine, and buffer the multiple video effect-related data. When a certain video effect needs to be applied to a video frame, a video effect algorithm in the buffered video effect-related data corresponding to the video effect may be directly loaded into the process for execution, so as to apply the video effect to the video frame.

At 302, the target application 110 may obtain an original video frame from the video source 102. For example, the video obtaining module 112 may obtain the original video frame from the video source 102. The step 302 is an instance of the step 202 in FIG. 2.

At 304, the original video frame may be communicated from the target application 110 to the video effect processing application 120. For example, the original video frame may be communicated from the video obtaining module 112 to the video effect applying module 122. In an implementation, at 304, the original video frame may be communicated from the target application 110 to the video effect processing application 120 in a transferrable ArrayBuffer approach. For example, the target application 110 may provide the original video frame to the video effect processing application 120 in the transferrable ArrayBuffer approach, and the video effect processing application 120 may obtain the original video frame from the target application 110 in the transferrable ArrayBuffer approach. In order to implement the communication of video frame between the main Web page of the target application 110 and the embedded Web page of the video effect processing application 120, a transferring function, e.g., PostMessage, for communicating data between pages may be adopted. The transferring approach may be set to the transferable ArrayBuffer approach in the adopted transferring function, so that a video frame may be communicated in the transferrable ArrayBuffer approach. Compared with other transferring approaches that can be applied by the transferring function, the transferrable ArrayBuffer approach does not need to perform processings such as serializing, encoding and decoding, etc., to a video frame, thus achieving a faster transferring speed. The step 304 is an instance of the step 204 in FIG. 2.

Optionally, at 306, the video effect processing application 120 may receive an indication about a video effect through a user interface. The step 306 is an instance of the step 206 in FIG. 2.

At 308, the video effect processing application 120 may apply the video effect to the original video frame to obtain a processed video frame. For example, the video effect applying module 122 may apply a video effect to the original video frame to obtain a processed video frame. If the indication about the video effect is received at 306, the video effect applying module 122 may apply the video effect specified by the indication to the original video frame based at least on the indication. The step 308 is an instance of the step 208 in FIG. 2.

At 310, the processed video frame to which the video effect is applied may be communicated from the video effect processing application 120 to the target application 110. For example, the processed video frame may be communicated from the video effect applying module 122 to the video obtaining module 112. In an implementation, at 310, the processed video frame may be communicated from the video effect processing application 120 to the target application 110 in the transferrable ArrayBuffer approach. For example, the video effect processing application 120 may provide the processed video frame to which the video effect is applied to the target application 110 in the transferrable ArrayBuffer approach, and the target application 110 may obtain the processed video frame to which the video effect is applied from the video effect processing application 120 in the transferrable ArrayBuffer approach. The step 310 is an instance of the step 210 in FIG. 2.

Figure 4:
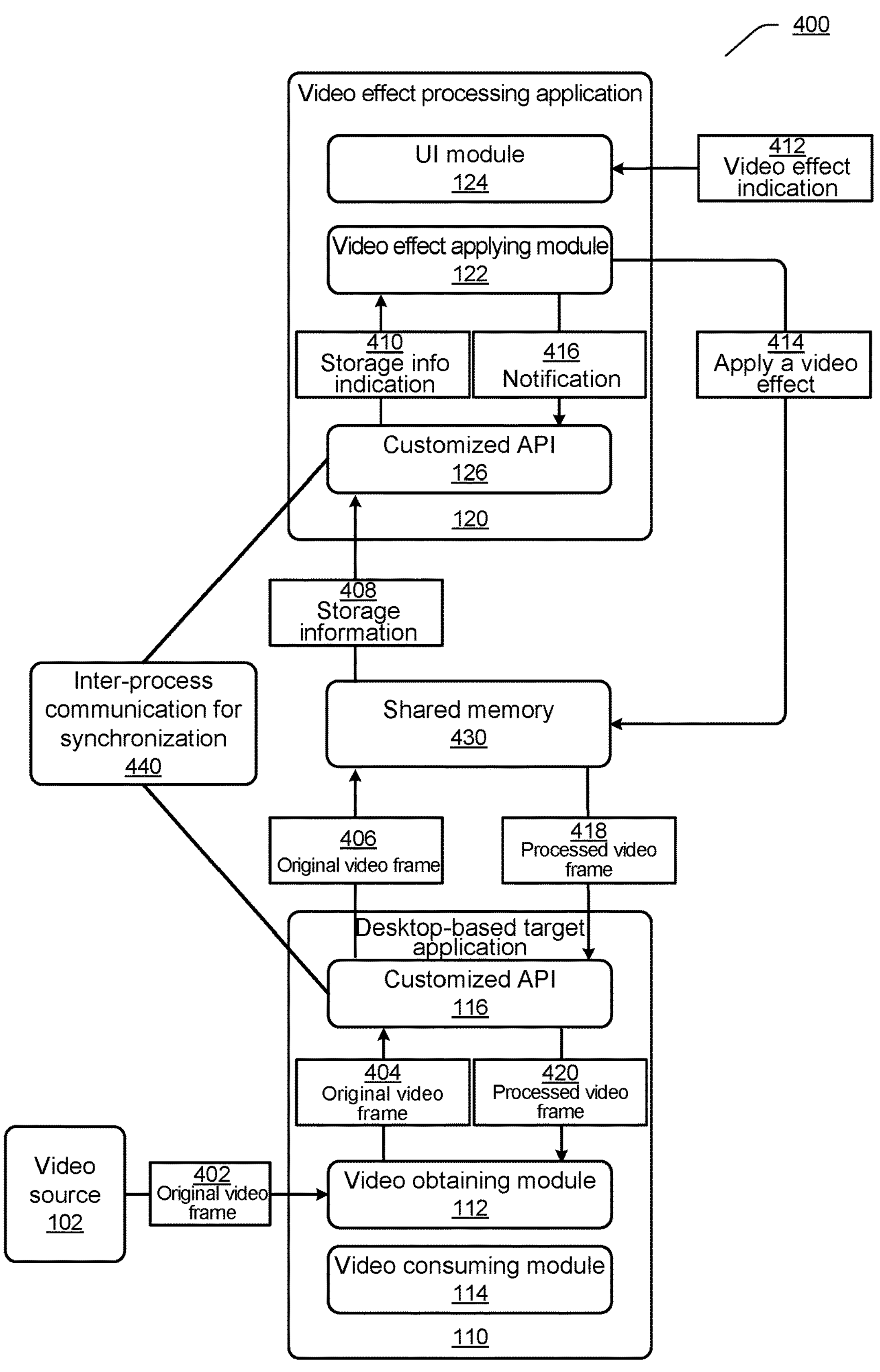
FIG. 4 illustrates an exemplary process for implementing video effect addition in the case that the target application is a desktop application according to an embodiment.

FIG. 4 illustrates an exemplary process 400 for implementing video effect addition in the case that the target application is a desktop application according to an embodiment.

In FIG. 4, the desktop-based target application 110 indicates that the target application is a desktop application. The desktop application may broadly refer to a locally-installed application or application client. Specifically, the desktop-based target application 110 in the process 400 may be an application created based on, e.g., Electron. Thus, the target application 110 may correspond to, e.g., an Electron rendering process.

In this case, the video effect processing application 120 may run in a Web content container such as Webview, e.g., run in an Electron Webview. By using Webview, the video effect processing application 120 may be loaded in the desktop-based target application 110. Similar to the approach of defining a URL in the iframe so as to load and run the video effect processing application 120 in the target application 110 as described above in connection with FIG. 3, a URL associated with the video effect processing application 120 may be defined in the Webview so as to download UI data, implement UI display, download video effect-related data, run a video effect algorithm, etc. In the process 400, an original video frame and a processed video frame may be efficiently communicated between the target application 110 and the video effect processing application 120 through a shared memory. Synchronous assess to the shared memory from the target application 110 and the video effect processing application 120 may be implemented through inter-process communication. Moreover, customized APIs may be set respectively for the target application 110 and the video effect processing application 120 at least for accessing the shared memory.

At 402, the target application 110 may obtain an original video frame from the video source 102. For example, the video obtaining module 112 may obtain the original video frame from the video source 102. The step 402 is an instance of the step 202 in FIG. 2.

At 404, the video obtaining module 112 may provide the original video frame to a customized API 116 of the target application 110. The customized API 116 may be used for creating a shared memory 430, implementing access to the shared memory 430 from the target application 110, etc. The customized API 116 may be implemented through various techniques, e.g., Electron API, Node.js Addon API, etc.

At 406, the target application 110 may store the original video frame into the shared memory 430. For example, the target application 110 may utilize the customized API 116 for storing the original video frame into the shared memory 430. In an implementation, a memcpy (memory copy) function may be utilized for storing the original video frame into the shared memory 430.

The video effect processing application 120 may include a customized API 126. The customized API 126 may be used for implementing access to the shared memory 430 from the video effect processing application 120, etc. The customized API 126 may be implemented through various techniques, e.g., Electron API, Node.js Addon API, etc.

After the original video frame is stored into the shared memory 430, at 408, the video effect processing application 120 may utilize the customized API 126 for obtaining storage information of the original video frame in the shared memory 430. The storage information may include various types of information for locating the original video frame in the shared memory 430, e.g., memory pointer, size, etc. of the original video frame.

According to the process 400, the video effect applying module 122 may apply a video effect to the original video frame in the shared memory 430 based at least on the storage information.

In an implementation, at 410, the customized API 126 may generate a storage information indication from the obtained storage information, and provide the storage information indication to the video effect applying module 122. The storage information indication may include storage space information of the original video frame in the shared memory 430 that is understandable by the video effect applying module 122. For example, the storage information indication may adopt a SharedArrayBuffer approach.

Optionally, at 412, the video effect processing application 120 may receive an indication about a video effect through a user interface. The step 412 is an instance of the step 206 in FIG. 2.

At 414, the video effect applying module 122 may directly apply the video effect to the original video frame in the shared memory 430 based on the storage information indication generated from the storage information, to obtain a processed video frame. If the indication about the video effect is received at 412, the video effect applying module 122 may apply the video effect specified by the indication to the original video frame based at least on the indication. The step 414 is an instance of the step 208 in FIG. 2.

After completing the video effect applying at 414, the video effect applying module 122 may send a notification to the customized API 126 at 416, so as to inform the customized API 126 that it has completed the operation of applying the video effect to the original video frame.

At 418, the target application 110 may read the processed video frame from the shared memory 430. For example, the customized API 116 may read the processed video frame from the shared memory 430.

At 420, the customized API 116 may provide the processed video frame to the video obtaining module 112.

In the process 400, the steps 404, 406, 408, 410, etc., may correspond to the operation of communicating the original video frame from the target application 110 to the video effect processing application 120 at the step 204 in FIG. 2. For example, the target application 110 may provide the original video frame to the video effect processing application 120 through the shared memory 430, and the video effect processing application 120 may obtain the original video frame from the target application 110 through the shared memory 430. It should be understood that, due to the use of the shared memory 430, the operation of providing the original video frame to the video effect processing application 120 by the target application 110 may refer to that the target application 110 stores the original video frame into the shared memory 430 and provides the storage information of the original video frame in the shared memory 430 to the video effect processing application 120, and the operation of obtaining the original video frame from the target application 110 by the video effect processing application 120 may refer to that the video effect processing application 120 obtains the storage information. In the process 400, since the video effect processing application 120 does not actually receive the original video frame, but accesses the original video frame in the shared memory 430 based at least on the storage information (e.g., based on the storage information indication generated from the storage information), thus, the time and resources required for actually sending the original video frame to the video effect processing application 120 may be saved, thereby improving execution efficiency.

In the process 400, the step 418 may correspond to the communicating of the processed video frame from the video effect processing application 120 to the target application 110 at the step 210 in FIG. 2. For example, the target application 110 may obtain the processed video frame from the video effect processing application 120 through the shared memory 430. It should be understood that, due to the use of the shared memory 430, the operation of obtaining the processed video frame from the video effect processing application 120 by the target application 110 may refer to that the target application 110 reads the processed video frame from the shared memory 430.

It should be understood that the process 400 may further comprise implementing synchronous assess to the shared memory 430 from the target application 110 and the video effect processing application 120 through inter-process communication at 440. The inter-process communication at 440 may refer to communication between the process of the target application 110 and the process of the video effect processing application 120, which may be continuously performed so that when one of the target application 110 and the video effect processing application 120 accesses the shared memory 430 and causes the state of the shared memory 430 to change, another one of the target application 110 and the video effect processing application 120 may obtain a notification timely and further perform the next operation. The inter-process communication may be performed between the customized API 116 and the customized API 126. For example, after the customized API 116 stores the original video frame into the shared memory 430 at 406, the customized API 116 may notify the customized API 126, through the inter-process communication, that it has completed storing the original video frame. Thus, the customized API 126 may then obtain the storage information at 408. For example, after the video effect applying module 122 has completed the video effect applying operation at 414 and notified the customized API 126 at 416, the customized API 126 may notify the customized API 116, through the inter-process communication, that the operation of applying the video effect to the original video frame has been completed. Thus, the customized API 116 may then read the processed video frame from the shared memory 430 at 418. The inter-process communication at 440 may be implemented through various techniques, e.g., event object, socket, semaphore, etc. The embodiments of the present disclosure are not limited to any specific techniques for implementing the inter-process communication.

Figure 5:
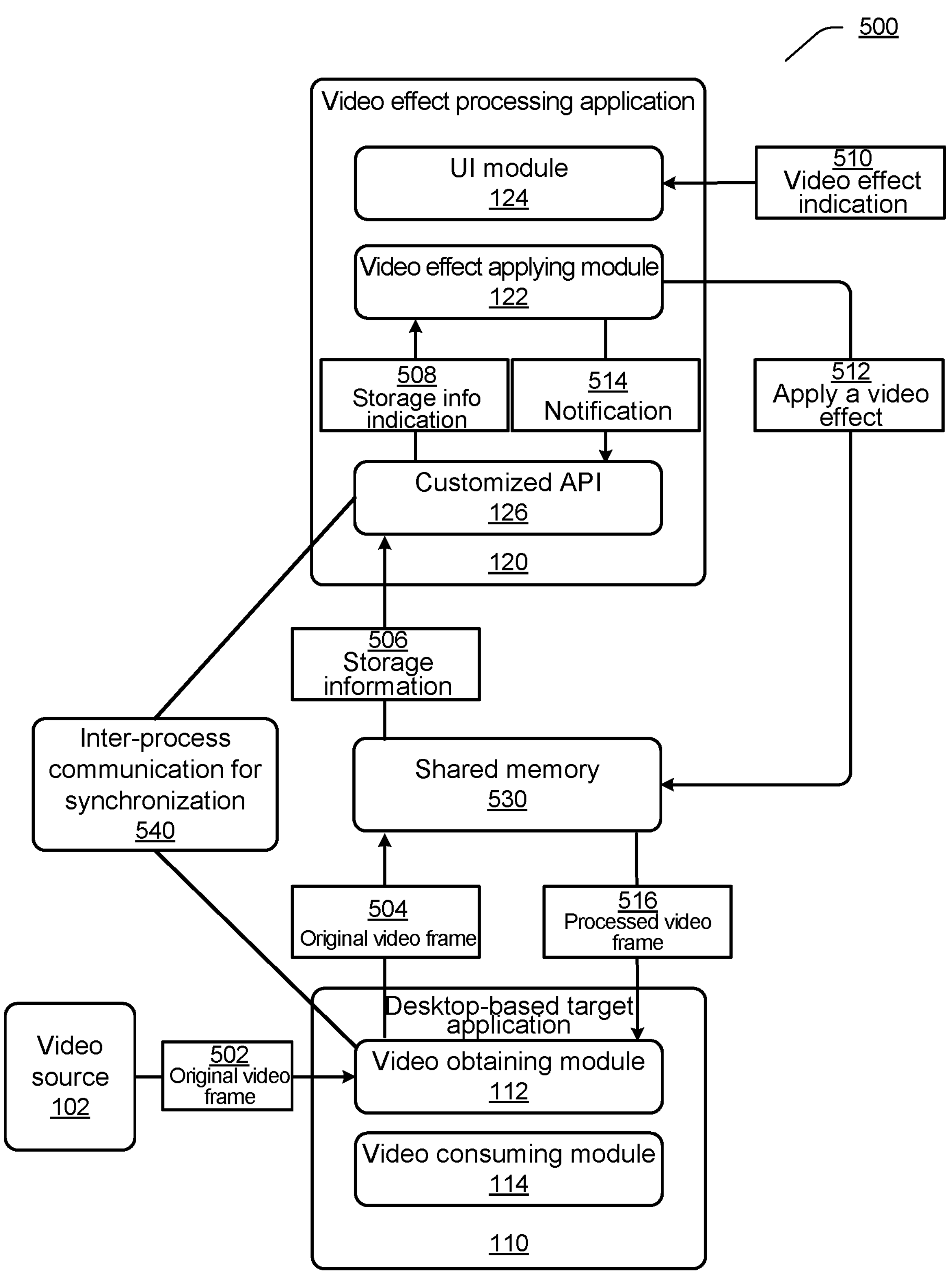
FIG. 5 illustrates an exemplary process for implementing video effect addition in the case that the target application is a desktop application according to an embodiment.

FIG. 5 illustrates an exemplary process 500 for implementing video effect addition in the case that the target application is a desktop application according to an embodiment.

In FIG. 5, the desktop-based target application 110 indicates that the target application is a desktop application. Specifically, the desktop-based target application 110 in the process 500 may be an application that is created by using native solutions such as C/C++. Thus, the target application 110 may directly access system resources, e.g., creating and accessing a shared memory, etc., without the need of using an API.

In this case, the video effect processing application 120 may run in a Web content container such as Webview, e.g., run in an Electron Webview. By using the Webview, the video effect processing application 120 may be loaded in the desktop-based target application 110. Similar to the approach of defining a URL in the iframe so as to load and run the video effect processing application 120 in the target application 110 as described above in connection with FIG. 3, a URL associated with the video effect processing application 120 may be defined in the Webview so as to download UI data, implement UI display, download video effect-related data, run a video effect algorithms, etc. In the process 500, an original video frame and a processed video frame may be efficiently communicated between the target application 110 and the video effect processing application 120 through a shared memory. Synchronous assess to the shared memory from the target application 110 and the video effect processing application 120 may be implemented through inter-process communication. Moreover, a customized API may be set for the video effect processing application 120 at least for accessing the shared memory.

At 502, the target application 110 may obtain an original video frame from the video source 102. For example, the video obtaining module 112 may obtain the original video frame from the video source 102. The step 502 is an instance of the step 202 in FIG. 2.

At 504, the target application 110 may create a shared memory 530 and store the original video frame into the shared memory 530. For example, the video obtaining module 112 may store the original video frame into the shared memory 530.

The video effect processing application 120 may include a customized API 126. The customized API 126 may be used for implementing access to the shared memory 530 from the video effect processing application 120, etc. The customized API 126 may be implemented through various techniques, e.g., Electron API, Node.js Addon API, etc.

After the original video frame is stored into the shared memory 530, at 506, the video effect processing application 120 may utilize the customized API 126 for obtaining storage information of the original video frame in the shared memory 530. The storage information may include various types of information for locating the original video frame in the shared memory 530, e.g., memory pointer, size, etc. of the original video frame.

According to the process 500, the video effect applying module 122 may apply a video effect to the original video frame in the shared memory 530 based at least on the storage information.

In an implementation, at 508, the customized API 126 may generate a storage information indication from the obtained storage information, and provide the storage information indication to the video effect applying module 122. The storage information indication may include storage space information of the original video frame in the shared memory 530 that is understandable by the video effect applying module 122. For example, the storage information indication may adopt a SharedArrayBuffer approach.

Optionally, at 510, the video effect processing application 120 may receive an indication about a video effect through a user interface. The step 510 is an instance of the step 206 in FIG. 2.

At 512, the video effect applying module 122 may directly apply the video effect to the original video frame in the shared memory 530 based on the storage information indication generated from the storage information, to obtain a processed video frame. If the indication about the video effect is received at 510, the video effect applying module 122 may apply the video effect specified by the indication to the original video frame based at least on the indication. The step 512 is an instance of the step 208 in FIG. 2.

After completing the video effect application at 512, the video effect applying module 122 may send a notification to the customized API 126 at 514, so as to inform the customized API 126 that it has completed the operation of applying the video effect to the original video frame.

At 516, the target application 110 may read the processed video frame from the shared memory 530. For example, the video obtaining module 112 may read the processed video frame from the shared memory 530.

In the process 500, the steps 504, 506, 508, etc., may correspond to the operation of communicating the original video frame from the target application 110 to the video effect processing application 120 at the step 204 in FIG. 2. For example, the target application 110 may provide the original video frame to the video effect processing application 120 through the shared memory 530, and the video effect processing application 120 may obtain the original video frame from the target application 110 through the shared memory 530. It should be understood that, due to the use of the shared memory 530, the operation of providing the original video frame to the video effect processing application 120 by the target application 110 may refer to that the target application 110 stores the original video frame into the shared memory 530 and provides the storage information of the original video frame in the shared memory 530 to the video effect processing application 120, and the operation of obtaining the original video frame from the target application 110 by the video effect processing application 120 may refer to that the video effect processing application 120 obtains the storage information. In the process 500, since the video effect processing application 120 does not actually receive the original video frame, but accesses the original video frame in the shared memory 530 based at least on the storage information (e.g., based on the storage information indication generated from the storage information), thus, the time and resources required for actually sending the original video frame to the video effect processing application 120 may be saved, thereby improving execution efficiency.

In the process 500, the step 516 may correspond to the operation of communicating the processed video frame from the video effect processing application 120 to the target application 110 at the step 210 in FIG. 2. For example, the target application 110 may obtain the processed video frame from the video effect processing application 120 through the shared memory 530. It should be understood that, due to the use of the shared memory 530, the operation of obtaining the processed video frame from the video effect processing application 120 by the target application 110 may refer to that the target application 110 reads the processed video frame from the shared memory 530.

It should be understood that the process 500 may further comprise implementing synchronous assess to the shared memory 530 from the target application 110 and the video effect processing application 120 through inter-process communication at 540. The inter-process communication at 540 may refer to communication between the process of the target application 110 and the process of the video effect processing application 120, which may be continuously performed so that when one of the target application 110 and the video effect processing application 120 accesses the shared memory 530 and causes the state of the shared memory 530 to change, another one of the target application 110 and the video effect processing application 120 may obtain a notification timely and further perform the next operation. The inter-process communication may be performed between the video obtaining module 112 and the customized API 126. For example, after the video obtaining module 112 stores the original video frame into the shared memory 530 at 504, the video obtaining module 112 may notify the customized API 126, through inter-process communication, that it has completed storing the original video frame. Thus, the customized API 126 may then obtain the storage information at 506. For example, after the video effect applying module 122 has completed the video effect applying operation at 512 and notified the customized API 126 at 514, the customized API 126 may notify the video obtaining module 112, through the inter-process communication, that the operation of applying the video effect to the original video frame has been completed. Thus, the video obtaining module 112 may then read the processed video frame from the shared memory 530 at 516. The inter-process communication at 540 may be implemented through various techniques, e.g., event object, socket, semaphore, etc. The embodiments of the present disclosure are not limited to any specific techniques for implementing the inter-process communication.

It should be understood that all the steps and their sequences in the processes for implementing video effect addition as described above in connection with FIG. 3 to FIG. 5 are exemplary, and these processes may be modified in any approaches according to specific application scenarios and requirements. For example, although it is shown in FIG. 3 to FIG. 5 that the UI module 124 may receive an indication about a video effect, in the case that the UI module 124 does not receive an indication about a video effect, the video effect processing application may also determine which video effect will be applied to a video frame based on any predetermined rules. For example, in FIG. 4 and FIG. 5, in the case that the target application is a desktop application, the video effect processing application may run in a sandbox environment, e.g., run in a sandboxed iframe or Webview. Since the sandbox mechanism may effectively restrict access to system resources from an application, security risk issues may be further effectively avoided through running the video effect processing application in the sandbox environment. The embodiments of the present disclosure are not limited to any specific implementations of running the video effect processing application in the sandbox environment.

FIG. 6A to FIG. 6D illustrate exemplary user interfaces for implementing video effect addition according to embodiments. In FIG. 6A to FIG. 6D, it is assumed that the target application is a Web-based or desktop-based online meeting application, and a user Betty of the online meeting application desires to add a video effect to her own video image. The exemplary user interfaces in FIG. 6A to FIG. 6D are presented on a terminal device of the user Betty.

Figure 6A:
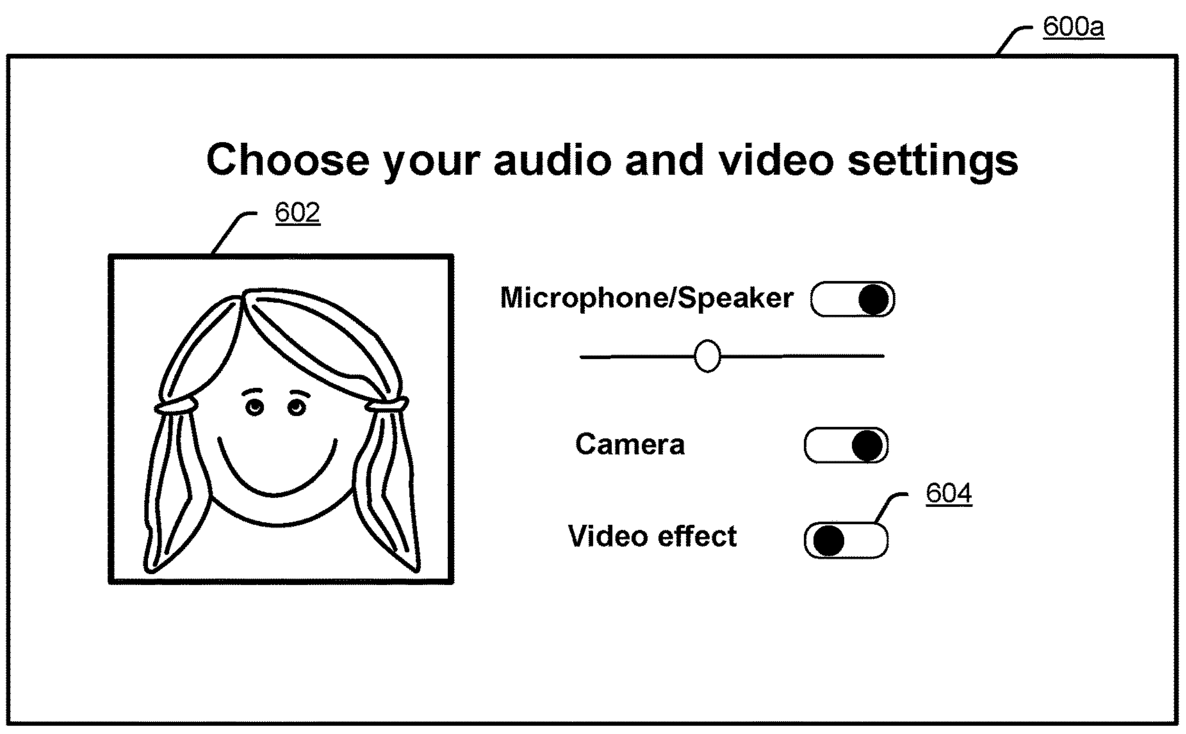
FIG. 6A to FIG. 6D illustrate exemplary user interfaces for implementing video effect addition according to embodiments.

FIG. 6A shows a user interface 600*a* of the online meeting application. The user interface 600*a* displays an interface for making audio and video settings. The audio and video settings may include, e.g., whether to turn on a microphone/speaker, volume adjustment, whether to turn on a camera, whether to turn on video effects, etc. It is assumed that Betty has turned on a camera, and Betty's video image captured by the camera is presented in block 602. In the user interface 600*a*, a control 604 is in an off state, which indicates that video effects have not been turned on.

Figure 6B:
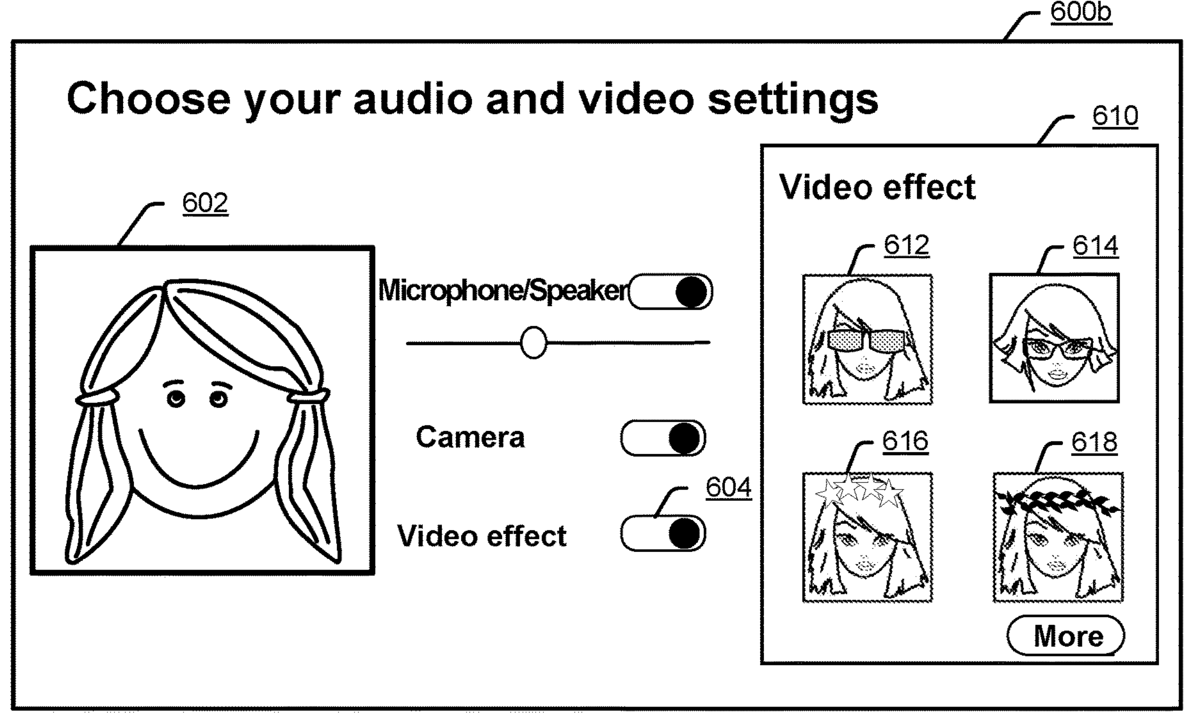

Assuming that Betty turns on the control 604 in the user interface 600*a*, to indicate that she desires to add a video effect to the video image in the block 602. The turning on of the control 604 will trigger to load and run a video effect processing application in the online meeting application, e.g., trigger to download UI data of the video effect processing application and implement UI display, and optionally, trigger to download and buffer video effect-related data, etc. Accordingly, the online meeting application will then present a user interface 600*b* as shown in FIG. 6B.

In the user interface 600*b*, the control 604 is already in an on state. The user interface 600*b* includes a user interface 610 of the video effect processing application. For example, the user interface 610 is generated by a UI module of the video effect processing application. The user interface 610 includes a plurality of exemplary video effect icons 612 to 618. The video effect icon 612 indicates that a pair of sunglasses will be added to the face of a person in an original image frame. The video effect icon 614 indicates that a pair of normal glasses will be added to the face of a person in an original image frame, and the hairstyle of the person will be changed. The video effect icon 616 indicates that star decorations will be added to the hair of a person in an original image frame. The video effect icon 618 indicates that a foliage headdress will be added to the hair of a person in an original image frame. The user interface 610 may also include a "more" button, and clicking to the button will trigger to load more video effect icons.

Figure 6C:
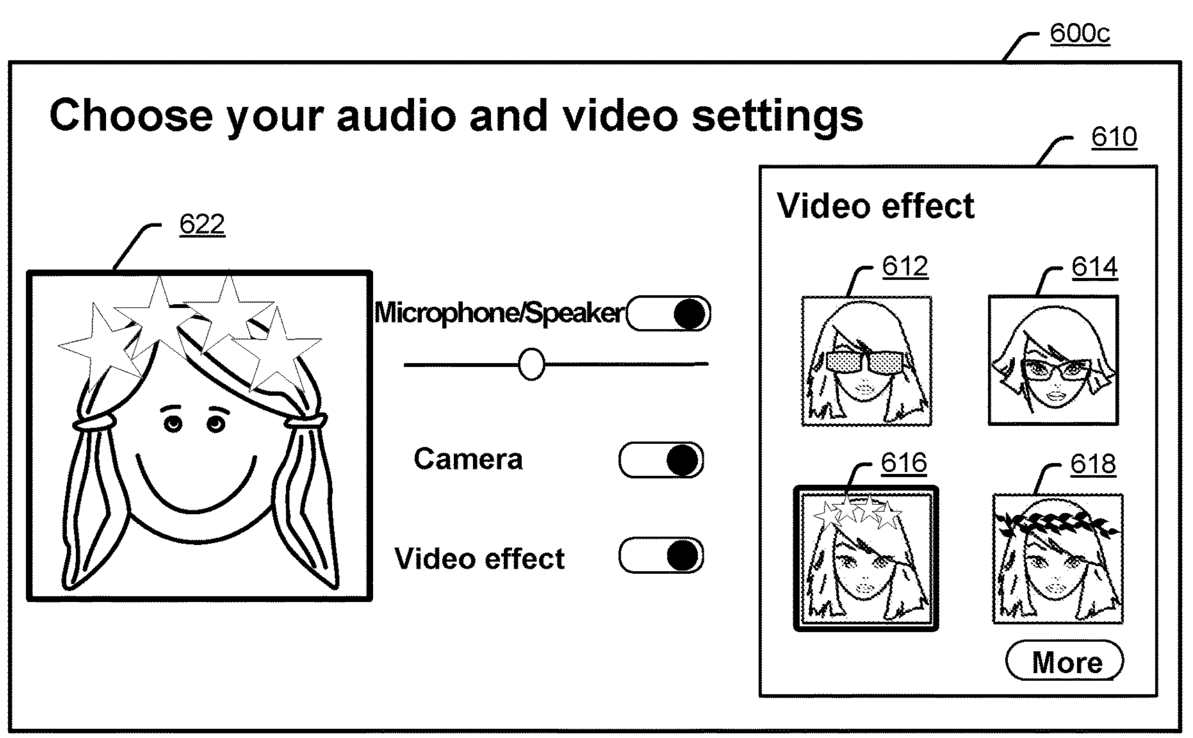

Assuming that Betty selects the video effect icon 616 in the user interface 600*b*, to indicate that she desires to add star decorations to the hair in the video image presented in the block 602. The selection of the video effect icon 616 will trigger to download video effect-related data of a video effect corresponding to the video effect icon 616 and run a corresponding video effect algorithm, or trigger to directly run a locally-buffered video effect algorithm corresponding to the video effect icon 616. A video effect applying module of the video effect processing application will use the video effect algorithm to apply a video effect material of "star decorations" on the hair of the person in the original video frame in the block 602. Accordingly, the online meeting application will then present a user interface 600*c* as shown in FIG. 6C.

In the user interface 600*c*, the video effect icon 616 is highlighted to indicate that a video effect corresponding to the video effect icon 616 is currently adopted. In a block 622, Betty's video image, to which the video effect of "star decorations" is added, is presented.

Figure 6D:
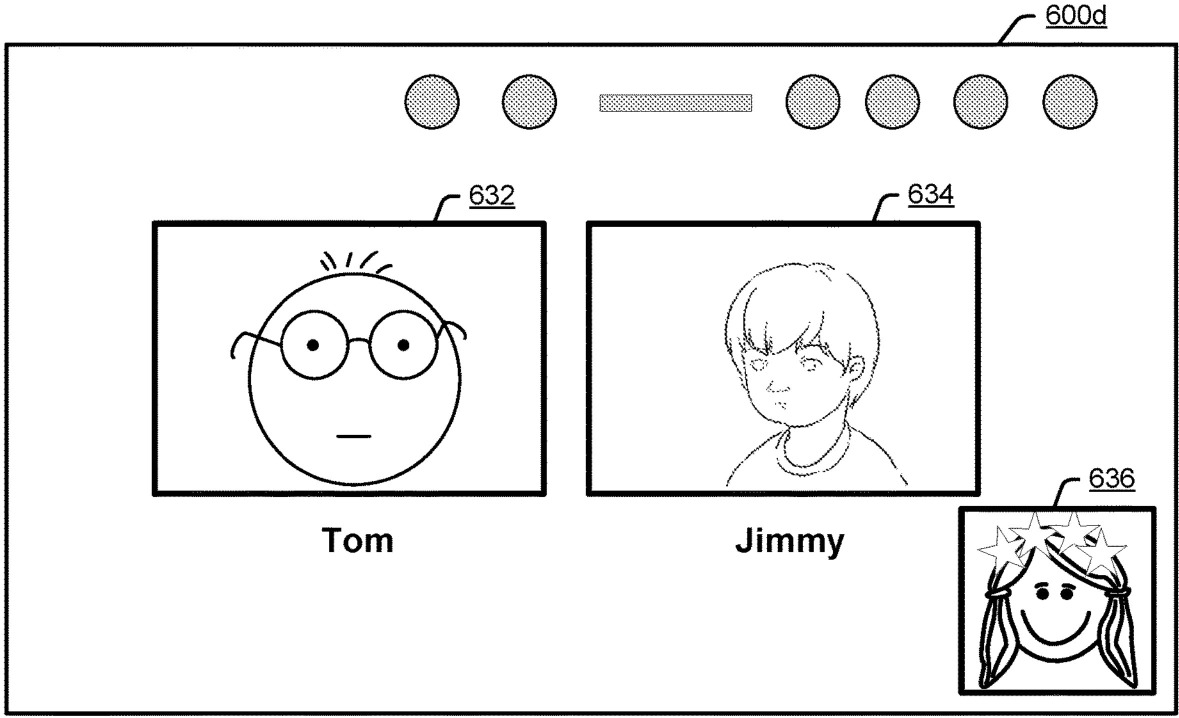

Assuming that Betty joins in an online meeting after the video effect is added. FIG. 6D shows a meeting interface 600*d* regarding the online meeting of the online meeting application. Block 632 presents a video image of a meeting participant Tom, and block 634 presents a video image of a meeting participant Jimmy. Block 636 presents Betty's own video image, wherein the video effect of "star decorations" has been added to Betty's video image. It should be understood that, in meeting interfaces presented on respective terminal devices of Tom and Jimmy, Betty's video image will be the video image to which the video effect has been added as presented in the block 636, instead of the original video image presented in the block 602 in FIG. 6A and FIG. 6B.

Moreover, if Betty did not set a video effect before the online meeting starts, Betty may also set a video effect during the online meeting. For example, a plurality of operation buttons in the upper portion of the user interface 600*d* may include buttons for audio and video settings or buttons for adding video effects, for navigating to the user interface 600*a* or 600*b* so as to further set a video effect.

It should be understood that all the elements and their layouts in FIG. 6A to FIG. 6D are exemplary, and various variations may exist in different target applications and different actual scenarios. The embodiments of the present disclosure are not limited to any specific details of the user interface. Moreover, it should be understood that although FIG. 6B and FIG. 6C only show the user interface 610 corresponding to the single one video effect processing application, in the case that the target application supports a plurality of video effect processing applications, a plurality of user interfaces corresponding to the plurality of video effect processing applications may also be displayed simultaneously, so that the user may select a desired video effect in a user interface of any one of the video effect processing applications.

Figure 7:
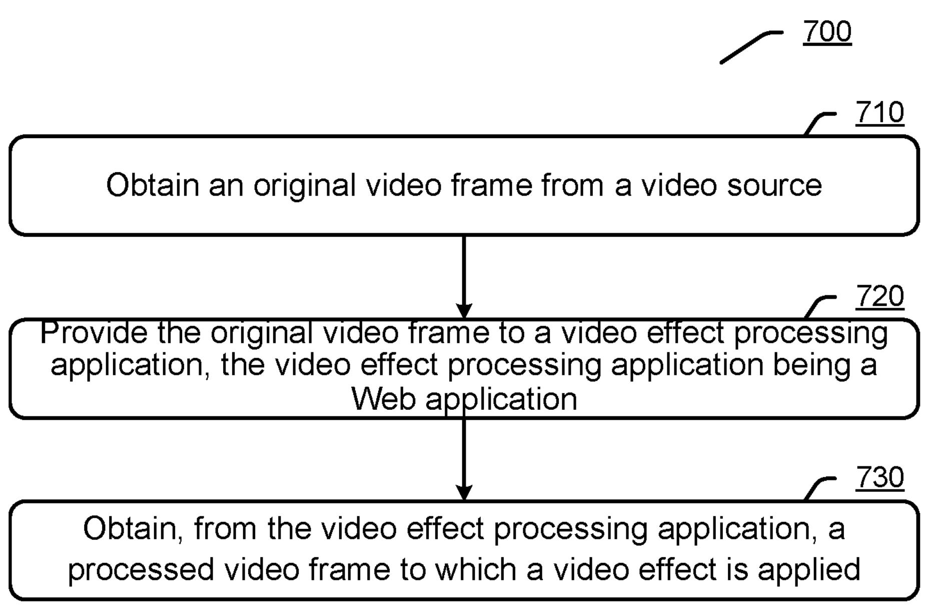
FIG. 7 illustrates a flowchart of an exemplary method for implementing video effect addition according to an embodiment.

FIG. 7 illustrates a flowchart of an exemplary method 700 for implementing video effect addition according to an embodiment. The method 700 may be performed at a target application.

At 710, an original video frame may be obtained from a video source.

At 720, the original video frame may be provided to a video effect processing application, the video effect processing application being a Web application.

At 730, a processed video frame to which a video effect is applied may be obtained from the video effect processing application.

In an implementation, the target application may be a Web application.

The providing the original video frame may comprise: providing the original video frame to the video effect processing application in an approach of transferrable ArrayBuffer. The obtaining a processed video frame may comprise: obtaining, from the video effect processing application, the processed video frame in an approach of transferrable ArrayBuffer.

In an implementation, the target application may be a desktop application.

The providing the original video frame may comprise: providing the original video frame to the video effect processing application through a shared memory. The obtaining a processed video frame may comprise: obtaining, from the video effect processing application, the processed video frame through the shared memory.

The providing the original video frame may comprise: storing the original video frame into the shared memory. The obtaining the processed video frame may comprise: reading the processed video frame from the shared memory.

The storing the original video frame may comprise: storing the original video frame into the shared memory with a customized API. The reading the processed video frame may comprise: reading the processed video frame from the shared memory with the customized API.

Synchronous assess to the shared memory from the target application and the video effect processing application may be implemented, through inter-process communication.

It should be understood that the method 700 may further comprise any step/process performed at the target application for implementing video effect addition according to the above embodiments of the present disclosure.

Figure 8:
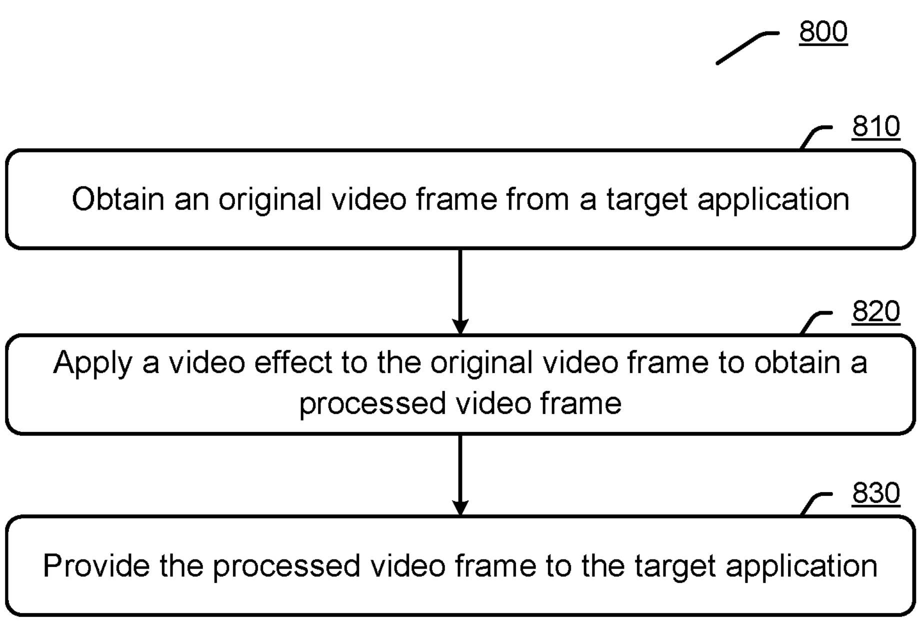
FIG. 8 illustrates a flowchart of an exemplary method for implementing video effect addition according to an embodiment.

FIG. 8 illustrates a flowchart of an exemplary method 800 for implementing video effect addition according to an embodiment. The method 800 may be performed at a video effect processing application which may be a Web application.

At 810, an original video frame may be obtained from a target application.

At 820, a video effect may be applied to the original video frame to obtain a processed video frame.

At 830, the processed video frame may be provided to the target application.

In an implementation, the video effect processing application may run in a Web content container. In an implementation, the target application may be a Web application, and the Web content container may be iframe.

The obtaining an original video frame may comprise: obtaining the original video frame from the target application in an approach of transferrable ArrayBuffer. The providing the processed video frame may comprise: providing the processed video frame to the target application in an approach of transferrable ArrayBuffer.

In an implementation, the target application may be a desktop application, and the Web content container may be Webview.

The obtaining an original video frame may comprise: obtaining the original video frame from the target application through a shared memory. The providing the processed video frame may comprise: providing the processed video frame to the target application through the shared memory.

The obtaining the original video frame may comprise: obtaining storage information of the original video frame in the shared memory with a customized API. The applying a video effect may comprise: applying, in the shared memory, the video effect to the original video frame based at least on the storage information.

Synchronous assess to the shared memory from the video effect processing application and the target application may be implemented through inter-process communication.

The video effect processing application may run in a sandbox environment.

In an implementation, the method 800 may further comprise: receiving an indication about the video effect through a user interface. The video effect may be applied based at least on the indication.

It should be understood that the method 800 may further comprise any step/process performed at the video effect processing application for implementing video effect addition according to the above embodiments of the present disclosure.

Figure 9:
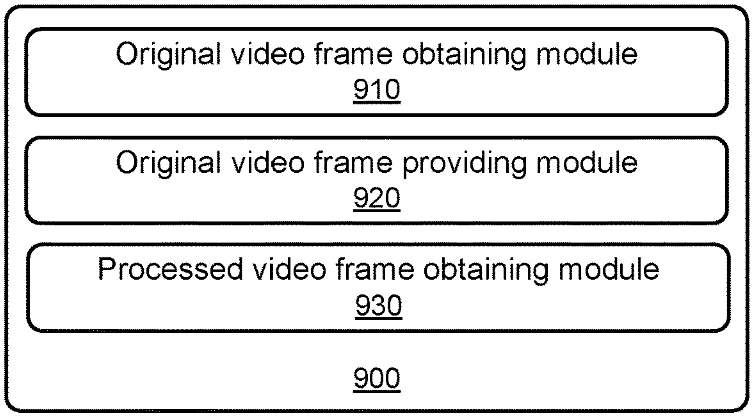
FIG. 9 illustrates an exemplary apparatus for implementing video effect addition according to an embodiment.

FIG. 9 illustrates an exemplary apparatus 900 for implementing video effect addition according to an embodiment. The apparatus 900 may be implemented at a target application.

The apparatus 900 may comprise: an original video frame obtaining module 910, for obtaining an original video frame from a video source; an original video frame providing module 920, for providing the original video frame to a video effect processing application, the video effect processing application being a Web application; and a processed video frame obtaining module 930, for obtaining, from the video effect processing application, a processed video frame to which a video effect is applied. Moreover, the apparatus 900 may further comprise any other modules, implemented at the target application, that perform steps of the methods for implementing video effect addition according to the above embodiments of the present disclosure.

Figure 10:
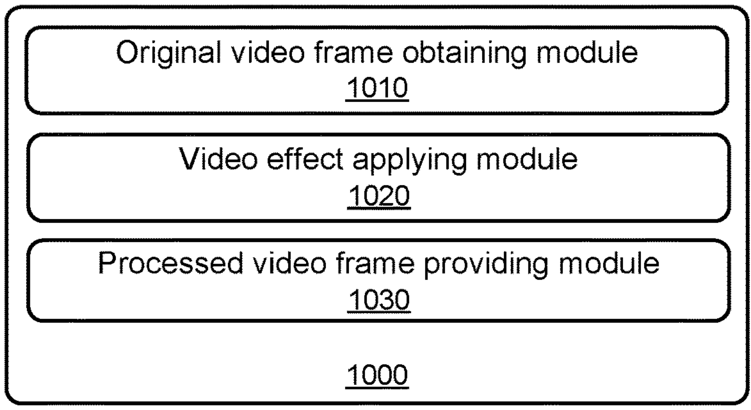
FIG. 10 illustrates an exemplary apparatus for implementing video effect addition according to an embodiment.

FIG. 10 illustrates an exemplary apparatus 1000 for implementing video effect addition according to an embodiment. The apparatus 1000 may be implemented at a video effect processing application which may be a Web application.

The apparatus 1000 may comprise: an original video frame obtaining module 1010, for obtaining an original video frame from a target application; a video effect applying module 1020, for applying a video effect to the original video frame to obtain a processed video frame; and a processed video frame providing module 1030, for providing the processed video frame to the target application. Moreover, the apparatus 1000 may further comprise any other modules, implemented at the target application, that perform steps of the methods for implementing video effect addition according to the above embodiments of the present disclosure.

Figure 11:
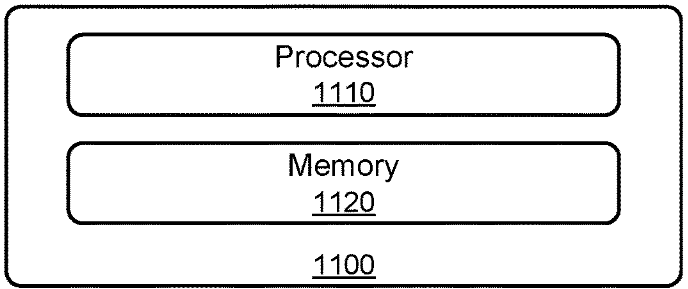
FIG. 11 illustrates an exemplary apparatus for implementing video effect addition according to an embodiment.

FIG. 11 illustrates an exemplary apparatus 1100 for implementing video effect addition according to an embodiment.

The apparatus 1100 may comprise: at least one processor 1110; and a memory 1120 storing computer-executable instructions. When the computer-executable instructions are executed, the at least one processor 1110 may perform any steps/processes of the methods for implementing video effect addition according to the above embodiments of the present disclosure.

The embodiments of the present disclosure propose a computer program product for implementing video effect addition, comprising a computer program that is executed by at least one processor for performing any steps/processes of the methods for implementing video effect addition according to the above embodiments of the present disclosure.

The embodiments of the present disclosure may be embodied in a non-transitory computer-readable medium. The non-transitory computer readable medium may comprise instructions that, when executed, cause one or more processors to perform any steps/processes of the methods for implementing video effect addition according to the above embodiments of the present disclosure. It should be appreciated that all the operations in the methods described above are merely exemplary, and the present disclosure is not limited to any operations in the methods or sequence orders of these operations, and should cover all other equivalents under the same or similar concepts.

Moreover, the articles "a" and "an" as used in this description and appended claims, unless otherwise specified or clear from the context that they are for the singular form, should generally be interpreted as meaning "one" or "one or more."

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a micro-processor, micro-controller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, micro-controller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for implementing video effect addition, the method being performed at a target application, and the method comprising:

obtaining an original video frame from a video source;

providing the original video frame to a video effect processing application, the video effect processing application being a Web application executed inside a sandboxed Web content container, wherein the sandboxed Web content container is instantiated in a restricted environment that denies the video effect processing application direct access to operating-system resources other than a designated shared-memory or MessageChannel port; and obtaining, from the video effect processing application, a processed video frame to which a video effect is applied.

2. The method of claim 1, wherein the target application is a Web application.

3. The method of claim 2, wherein the providing the original video frame comprises: providing the original video frame to the video effect processing application in an approach of transferrable ArrayBuffer, and the obtaining a processed video frame comprises: obtaining, from the video effect processing application, the processed video frame in an approach of transferrable ArrayBuffer.

4. The method of claim 1, wherein the target application is a desktop application.

5. The method of claim 4, wherein the providing the original video frame comprises: providing the original video frame to the video effect processing application through a shared memory, and the obtaining a processed video frame comprises: obtaining, from the video effect processing application, the processed video frame through the shared memory.

6. The method of claim 5, further comprising:

implementing, through inter-process communication, synchronous access to the shared memory from the target application and the video effect processing application.

7. An apparatus for implementing video effect addition, comprising:

at least one processor; and a memory storing computer-executable instructions that, when executed, cause the at least one processor to perform the step of the method of claim 1.

8. A method for implementing video effect addition, the method being performed at a video effect processing application, the video effect processing application being a Web application, and the method comprising:

obtaining an original video frame from a target application;

executing the video effect processing application inside a sandboxed Web content container, wherein the sandboxed Web content container is instantiated in a restricted environment that denies the video effect processing application direct access to operating-system resources other than a designated shared-memory or MessageChannel port:

applying a video effect to the original video frame to obtain a processed video frame; and providing the processed video frame to the target application.

9. The method of claim 8, wherein the video effect processing application runs in a Web content container.

10. The method of claim 9, wherein the target application is a Web application, and the Web content container is iframe.

11. The method of claim 10, wherein the obtaining an original video frame comprises: obtaining the original video frame from the target application in an approach of transferrable ArrayBuffer, and the providing the processed video frame comprises: providing the processed video frame to the target application in an approach of transferrable ArrayBuffer.

12. The method of claim 9, wherein the target application is a desktop application, and the Web content container is Webview.

13. The method of claim 12, wherein the obtaining an original video frame comprises: obtaining the original video frame from the target application through a shared memory, and the providing the processed video frame comprises: providing the processed video frame to the target application through the shared memory.

14. The method of claim 12, wherein the video effect processing application runs in a sandbox environment.

15. At least one non-transitory machine-readable medium, comprising instructions that when executed by at least one processor, cause the at least one processor to perform operations to:

obtain an original video frame from a video source;

provide the original video frame to a video effect processing application, the video effect processing application being a Web application executed inside a sandboxed Web content container, wherein the sandboxed Web content container is instantiated in a restricted environment that denies the video effect processing application direct access to operating-system resources other than a designated shared-memory or MessageChannel port; and obtain, from the video effect processing application, a processed video frame to which a video effect is applied.

16. The at least one non-transitory medium of claim 15, wherein the target application is a Web application.

17. The at least one non-transitory medium of claim 16, wherein the instructions to provide the original video frame further comprises instructions to provide the original video frame to the video effect processing application in an approach of transferrable ArrayBuffer, and the instructions to obtain a processed video frame further comprises instructions to obtain, from the video effect processing application, the processed video frame in an approach of transferrable ArrayBuffer.

18. The at least one non-transitory medium of claim 16, wherein the target application is a desktop application.

19. The at least one non-transitory medium of claim 18, wherein the instructions to provide the original video frame further comprises instructions to provide the original video frame to the video effect processing application through a shared memory, and the instructions to obtain a processed video frame further comprises instructions to obtain, from the video effect processing application, the processed video frame through the shared memory.

20. The at least one non-transitory medium of claim 19, further comprising instructions that when executed by at least one processor, cause the at least one processor to perform operations to:

implement, through inter-process communication, synchronous access to the shared memory from the target application and the video effect processing application.

* * * * *